Figure 1:
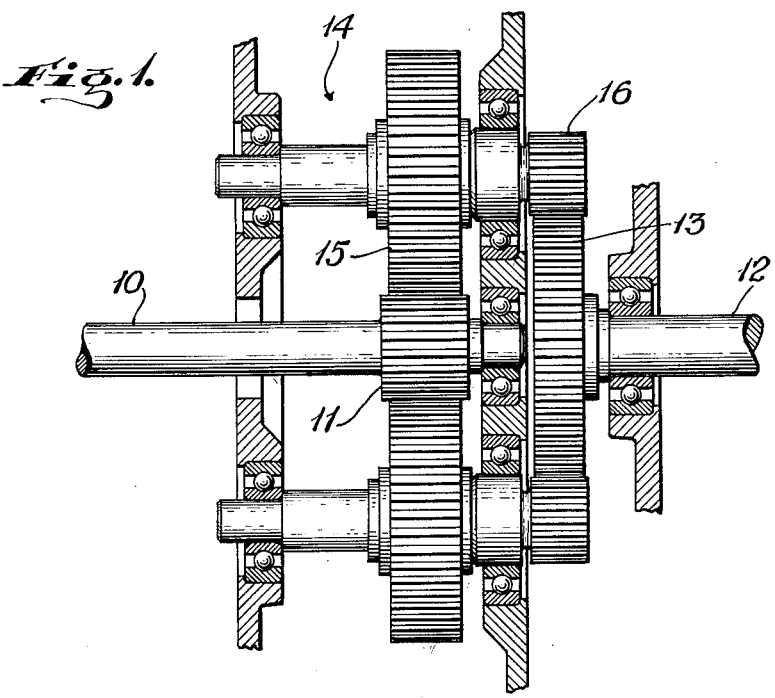

Feb. 2, 1965     M. E. SILBERGER     3,167,967
MULTIPLE CLUSTER GEAR TRAIN
Filed Oct. 23, 1962

INVENTOR.
MARVIN E. SILBERGER
BY James T. Bethell

United States Patent Office 3,167,967
Patented Feb. 2, 1965

3,167,967
MULTIPLE CLUSTER GEAR TRAIN
Marvin E. Silberger, York, Pa., assignor to American
Chain & Cable Company, Inc.
Filed Oct. 23, 1962, Ser. No. 232,468
1 Claim. (Cl. 74—411)

This invention relates to mechanisms, and more specifically, to gearing.

There are many uses for gearing in which the overall dimensions of the gear train must be kept at a minimum for a given amount of power transmitted. In the past, the limits of such size reduction have been approached by the utilization of special gear materials, and even, in some cases, highly developed lubricants, to enable the development of quite high tooth pressures with reasonable wear. Also, in the typical gear train having an input gear, a gear cluster on a jack-shaft and an output gear, attempts have been made to increase the power transmitted without significantly increasing the overall size of the train, by employing a multiplicity of gear clusters, all engaging the input and output gears. With such construction, it has been assumed in the past that the load will be divided among the clusters on the jack-shafts, greatly increasing the power transmitting ability of the train. Experiment has proved that this effect cannot be attained except with precision in manufacture far beyond economically reasonable limits for a very large class of applications.

With the above consideration in mind, it is a primary object of the present invention to provide a method for increasing the power transmitting ability of a gear train without unreasonable increase in the overall dimensions of the gear train.

It is a specific object of the present invention to increase the power transmission between an input and output gear coupled by a cluster of gears on a jack-shaft by adding an additional cluster and jack-shaft so constructed that load transmission for each cluster is approximately equal.

Broadly stated, the environment of the invention is a gear train including input and output gears fixed concentrically on respecitve separate axially rotatable coaxial shafts and drivingly interconnected by at least two gear clusters, each gear cluster including a jack-shaft mounted only for axial rotation with respect to and parallel with the axial shafts and having first and second pinions supported concentrically thereon in meshing engagement with the respective input and output gears. In accordance with the invention, improved transmission means are provided for at least one of said gear clusters comprising a cylindrical metal sleeve disposed concentrically about the associated jack-shaft. One end portion of the sleeve is secured to the jack-shaft to rotate therewith and the other end portion of the sleeve is secured to one of the associated pinions to rotate therewith. The intermediate portion of the sleeve between the end portions is elastically torsionally deformable during operation of the gear train, so that torque is resiliently transmitted through at least one of the gear clusters and is substantially equalized in all of the gear clusters.

Figure 2:
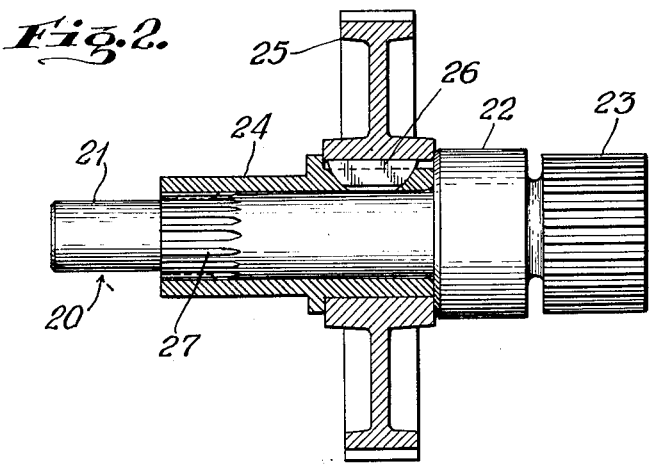

Referring now to the drawings:

FIGURE 1 is a showing, with parts removed, of a gear train employing the present invention; and FIGURE 2 is a showing, partly in section, of one of the elements of FIGURE 1.

For the purpose of illustration, the arrangement of FIGURE 1 is selected, showing two spur gears, drivingly connected by gear clusters on jack-shafts. It will become apparent, as the description proceeds, that this invention is not limited to any particular gear train, or even to spur and ring gears. It merely requires a multiplicity of cluster gears drivingly connecting the same driving and driven gears.

The particular arrangement in FIGURE 1 includes a driving shaft 10 carrying a pinion 11 and a driven shaft 12 carrying a gear 13. A cluster gear assembly 14, carrying a gear 15, meshing with the pinion 11, and a pinion 16, meshing with gear 13, completes the gear train. This is a very common assemblage, and a special arrangement only in that the driving and driven shafts are coaxial.

In the practice of this invention, a second cluster gear is added to the assembly. This cluster, so far as the gear and pinion are concerned, must of course be in all respects identical to the cluster just described. In the past, as has been pointed out above, it has been assumed that the construction so far described can transmit the load from the driving and driven gears through each cluster on an equal basis. This is not so. As a general rule, such clusters are machined out of a single forging, or assembled on a shaft with splines or keys so that the teeth of the cluster gears all mesh with the teeth of the driving and driven gears. There is no assurance, however, that the resulting assembly will not transmit the entire load through one cluster, while the other merely rotates. The reason for this is that with the gear teeth of each cluster machined with ordinary tolerances, it is impossible to so support each cluster in the frame of the machine that each cluster takes its share of the load.

In order to obviate this difficulty, one or more of the gear clusters are given the construction set forth in FIG. 2.

In that figure, a shaft 20, having bearing surfaces 21 and 22, is shown. At one end of the shaft, an integral pinion 23 corresponding to pinion 16 is provided. This pinion is shown as integral with the shaft, as a matter of manufacturing convenience. Mounted on the shaft 20 is an elongated sleeve 24, which in turn has mounted upon it a gear 25, suitably keyed at 26 against rotation with respect thereto. The sleeve 24 is fixed against rotation on shaft 20 at the left end only, as by splines at 27, or any other suitable means.

The purpose of this particular construction is to introduce a springiness between the gear 25 and the pinion 23. It can be appreciated that the sleeve, if made of a proper material, can be so thin that a considerable degree of torsional deflection will result from the transmission of torque between the gear 25 and the pinion 23, in the operation of the gear train. Such action tends to equalize the tooth pressure exerted by one gear cluster to that exerted by the other.

It is perfectly possible to use a solid cluster and the elastic cluster just described in the same gear train, relying upon the elasticity to properly distribute the load, so far as the principle of this invention is concerned. However, as a practical matter, it is much easier to make the device work right if all cluster gears are as shown in FIGURE 2. It will be understood that in practical constructions, the torsional flexibility in the gear clusters will not make inequality of loading of individual clusters vanish. However, it does decrease the inequality, especially as it permits assembly by springing the gears slightly to make them mesh, which assures contact of all proper teeth. As a result, the running in of the gears will tend to equalize the load. In constructions involving only relatively rigid clusters, it is possible to wear out one cluster without the other clusters ever taking any of the load.

I claim:

In a gear train including input and output gears fixed concentrically on respective separate axially rotatable coaxial shafts and drivingly interconnected by at least two identical gear clusters, each gear cluster including a jack-shaft mounted only for axial rotation with respect to and parallel with said axial shafts and having first and second pinions supported concentrically thereon in meshing engagement with the respective input and output gears, improved transmission means for at least one of said gear clusters comprising a cylindrical metal sleeve disposed concentrically about the associated jack-shaft, one end portion of said sleeve being secured to the associated jack-shaft to rotate therewith and the other end portion of said sleeve being secured to one of the associated pinions to rotate therewith, the intermediate portion of said sleeve between said end portions being elastically torsionally deformable during operation of the gear train, whereby torque is resiliently transmitted through at least one of said gear clusters and is substantially equalized in all of said gear clusters.

References Cited in the file of this patent
UNITED STATES PATENTS

| | | |
|---|---|---|
| 2,386,367 | Taylor | Oct. 9, 1945 |
| 2,737,056 | Baumgartner | Mar. 6, 1956 |
| 2,857,777 | Porter | Oct. 28, 1958 |
| 2,939,346 | McCarthy et al. | June 7, 1960 |
| 2,995,046 | Mansachs | Aug. 8, 1961 |
| 3,090,258 | Zink et al. | May 21, 1963 |